(12) United States Patent
Kim

(10) Patent No.: US 8,503,085 B2
(45) Date of Patent: Aug. 6, 2013

(54) HEAD-MOUNTED DISPLAY

(75) Inventor: In Kim, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 215 days.

(21) Appl. No.: 12/274,415

(22) Filed: Nov. 20, 2008

(65) Prior Publication Data

US 2009/0128919 A1 May 21, 2009

(30) Foreign Application Priority Data

Nov. 20, 2007 (KR) ........................ 10-2007-0118735

(51) Int. Cl.
*G02B 27/01* (2006.01)
(52) U.S. Cl.
USPC .......................................................... 359/630
(58) Field of Classification Search
USPC .......................................... 359/630; 353/28
See application file for complete search history.

(56) References Cited

U.S. PATENT DOCUMENTS

| | | | |
|---|---|---|---|
| 5,121,099 A * | 6/1992 | Hegg et al. ..................... | 359/630 |
| 6,421,031 B1 * | 7/2002 | Ronzani et al. ................ | 359/630 |
| 7,133,207 B2 * | 11/2006 | Travers ......................... | 359/630 |
| 2005/0174651 A1 * | 8/2005 | Spitzer et al. ................. | 359/630 |

* cited by examiner

*Primary Examiner* — Zachary Wilkes
(74) *Attorney, Agent, or Firm* — Cha & Reiter, LLC

(57) ABSTRACT

A head-mounted display for forming a virtual image at a predetermined distance in front of a user includes: a left eye unit and a right eye unit, each eye unit having an image module for generating an image and an optical system disposed at a predetermined distance from the image module and towards the user's eyeball for forming a virtual image at a predetermined distance from the user by enlarging the generated image. A main body has both the left eye unit and the right eye connected thereto, wherein portions of the main body to which the left eye unit and the right eye unit are connected are each inclined to sustain a predetermined angle from the center of the main body. By utilizing a user's visual convergence so that a virtual image may be displayed at a target position, variation of a distance determination between users is reduced, and thus a viewing effect to the user of a virtual image being formed at a target position is obtained, thereby improving user satisfaction.

17 Claims, 7 Drawing Sheets

HEAD-MOUNTED DISPLAY

CLAIM OF PRIORITY

This application claims priority under 35 U.S.C. §119 from an application entitled "HEAD-MOUNTED DISPLAY" filed in the Korean Intellectual Property Office on Nov. 20, 2007 and assigned Serial No. 2007-0118735, the contents of which are incorporated herein by reference in its entirety.

BACKGROUND OF THE INVENTION

1. Field of the Invention

The present invention relates to a head-mounted display. More particularly, the present invention relates to a head-mounted display that can view virtual images, when worn by a user.

2. Description of the Related Art

In general, a head-mounted display (HMD) is a device that is worn by a user and displays an image in front of the user's eyes in a virtual reality system or an augmented reality system. The HMD generally is embodied in the form of protective goggles or a helmet.

Referring to FIG. 1, a conventional HMD 10 includes a main body 20, and a left eye unit 30a and a right eye unit 30b that are connected thereto. The main body 20 is formed such that the left eye unit 30a and right eye unit 30b are parallel to the main body 20. Reference numerals 400a and 400b indicate the left eye and right eye, respectively, of a user.

When using the HMD, the user is under the impression that a wide screen is being provided in front of their eyes and thus the HMD can be used as a portable individual display. Further, when using the HMD, the user can control a microcomputer through a three-dimensional virtual menu screen displayed through the HMD, instead of controlling the microcomputer through a two-dimensional display screen. For a virtual image, the HMD typically includes an image module, including a liquid crystal display (LCD) for generating an image and an optical system such as a lens for forming the generated image as a virtual image at a predetermined virtual distance from the user.

Due to variations in determining distances between several users operating the HMD, the conventional HMD has a problem in that the user may receive an impression that a screen of a virtual image is small and is positioned at a relatively close location. Specifically, the user identifies a distance from the user to the virtual image using a monocular focus method. In the monocular focus method, when an eyeball muscle adjusts so that a virtual image may be viewed most clearly, the distance is determined by the viewer's normal visual sense. However, the ability to determine distance of various users varies considerably between the users. A field of view (FOV), which is the angle formed by light after light emitted from opposite sides of the LCD passes through a lens of the optical system, is determined by a size of the LCD and magnification power of the lens. The FOV is hence determined according to a configuration of an optical system, and does not vary between users.

However, as described above, for the FOV predetermined according to a system configuration, different users experience a different screen size due to the variation in distance determination between the users, and some users may experience that a virtual image exists at a distance closer than a designed location, and thus these users will receive the impression that a screen of the virtual image is small.

SUMMARY OF THE INVENTION

The present invention provides an HMD that can display a screen of a virtual image that reduces a variation of distance determination between users.

The present invention further provides an HMD in which a user's convergence is utilized to display a virtual image at a target position by forming a left eye unit and a right eye unit to be equally inclined so as to sustain a predetermined angle from a connection unit.

The present invention further provides an HMD that prevents confusion of a user about a distance by forming a frame into which an image source is inserted such that a height of a front portion of the frame protruding from an exposed surface of the image source is a minimum value.

In accordance with one exemplary aspect of the present invention, an HMD for forming a virtual image at a predetermined distance in front of a user includes: a left eye unit and a right eye unit, each eye unit having an image module for generating an image and an optical system disposed at a predetermined distance from the image module and towards the user's eyeball for forming a virtual image at a predetermined distance from the user by enlarging the generated image; and a main body to which the left eye unit and the right eye unit are connected, wherein portions of the main body to which the left eye unit and the right eye unit are connected are each inclined to sustain a predetermined angle from the center of the main body.

BRIEF DESCRIPTION OF THE DRAWINGS

The above features and advantages of the present invention will be more apparent from the following detailed description in conjunction with the accompanying drawings, in which.

DETAILED DESCRIPTION

Figure 1:
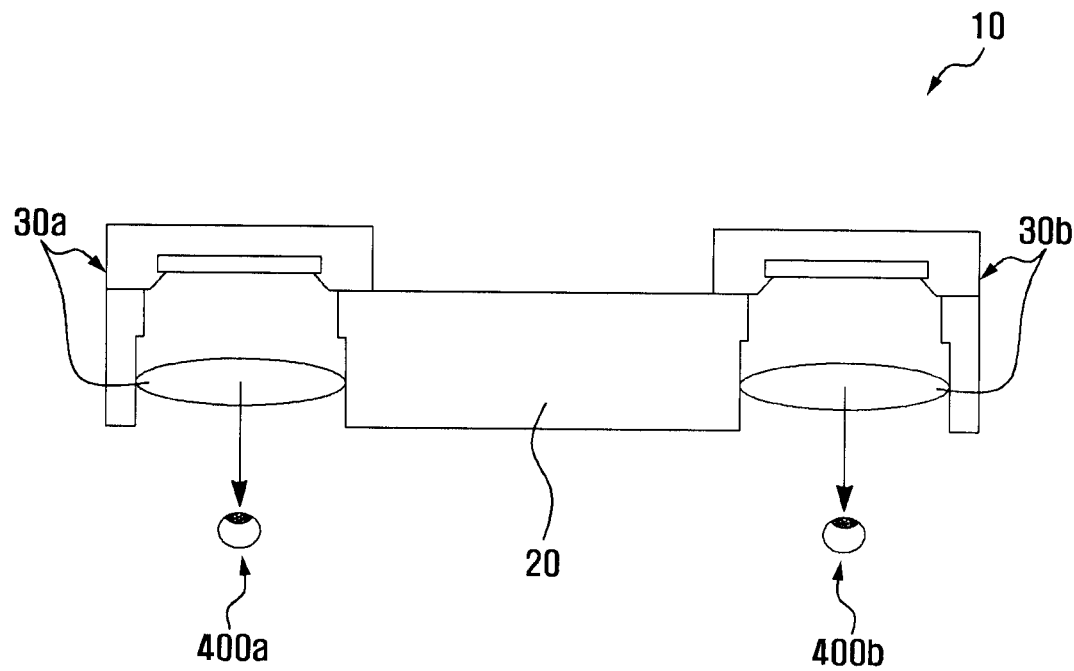
FIG. 1 is a schematic view illustrating a conventional HMD.

Hereinafter, exemplary embodiments of the present invention are described in detail with reference to the accompanying drawings. The same reference numbers are used throughout the drawings to refer to the same or like parts. The views in the drawings are typically schematic views only, and not intended to be to scale or correctly proportioned. For illustrative and explanatory purposes, the relative size of certain components may have been increased or decreased in a nonproportional manner. Detailed descriptions of well-known functions and structures incorporated herein may be omitted to avoid obscuring appreciation of the subject matter of the present invention by a person of ordinary skill in the art.

While the present invention may be embodied in many different forms, specific exemplary embodiments of the present invention are shown in drawings and are described herein in detail, with the understanding that the present disclosure is to be considered as an exemplification of the general principles of the invention and is not intended to limit the invention to the specific embodiments illustrated.

FIG. 1 is a schematic view illustrating a conventional HMD.

Figure 2A:
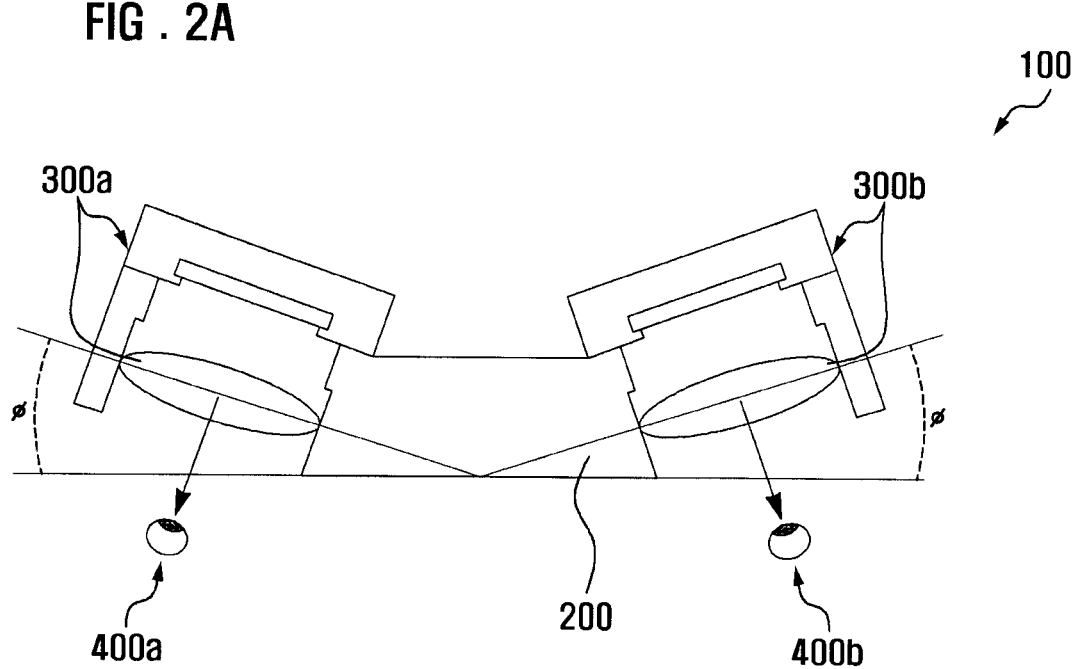
FIG. 2A is a schematic view illustrating an HMD according to an exemplary embodiment of the present invention.

FIG. 2A is a schematic view illustrating an HMD according to an exemplary embodiment of the present invention.

Referring to FIG. 2A, an HMD 100 according to the present exemplary embodiment includes a main body 200, and a left eye unit 300a and a right eye unit 300b that are connected thereto. Unlike the main body 20 shown in FIG. 1, portions of the main body 200 to which the left eye unit 300a and the right eye unit 300b are connected are formed such that the left eye unit 300a and right eye unit 300b are inclined outwardly at a predetermined angle Φ from the center of the main body 200.

The HMD 100 has a general form similar to spectacles, and a frame portion worn on the user's ears to mount the HMD 100 is omitted from the drawings. However, although the HMD 100 is mounted on the user in a general form of spectacles in the present exemplary embodiment, the HMD 100 is not limited thereto.

When the exemplary HMD 100 is mounted on the user, the left eye unit 300a and the right eye unit 300b are positioned in front of the left eye 400a and right eye 400b, respectively, of the user.

As shown in FIG. 2A, the portions of the main body 200 to which the left eye unit 300a and the right eye unit 300b are connected are inclined from the center of the main body 200 at a predetermined angle Φ that is typically acute. When the exemplary HMD 100 is mounted on the user, the main body 200 has a convex form relative to the user's left and right eyes 400a and 400b. The tilt angle Φ of the portions of the main body 200 to which the left eye unit 300a and the right eye unit 300b are connected is described in detail later with reference to FIG. 6.

Figure 2B:
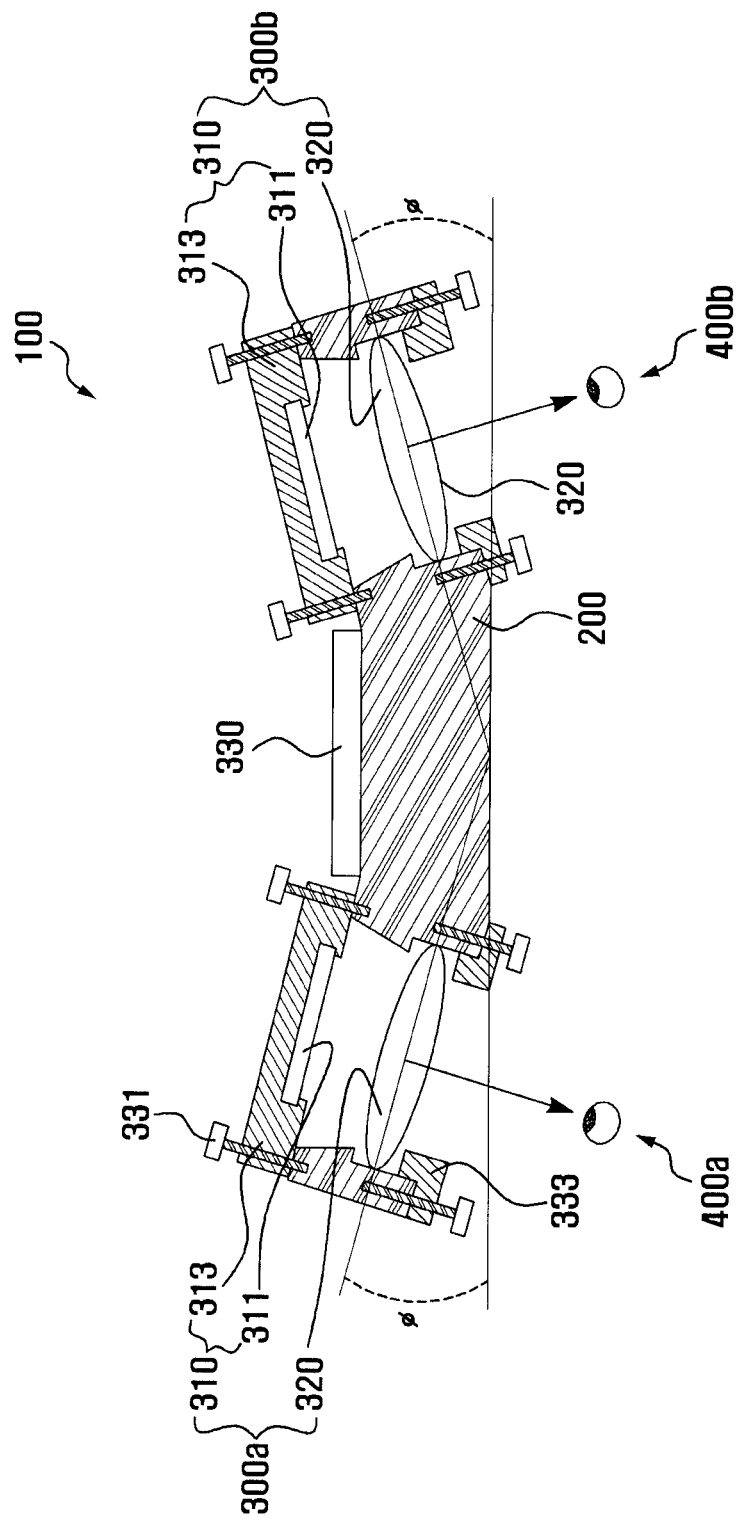
FIG. 2B is a cross-sectional view of the HMD of FIG. 2A.

FIG. 2B is a cross-sectional view of the HMD 100 of FIG. 2A.

Referring now to FIG. 2B, the left eye unit 300a and the right eye unit 300b of the HMD 100 each include an image module 310 and an optical system 320. Each of the image modules 310 displays a received image. When the HMD 100 is mounted on the user, the optical system 320 is disposed towards the user's corresponding left and right eyes 400a and 400b. The optical system 320 enables a virtual image to be formed at a predetermined distance from the user by enlarging an image generated in the image module 310. The optical system 320 may comprise, for example, a lens, a prism, a reflection mirror, or a combination thereof. When the optical system 320 comprises a lens, the optical system 320 may be formed with a combination of aspheric convex and concave lenses.

The image module 310 is connected to a driving circuit 330 to receive an image from the outside and transmit the image. The image module 310 is disposed at a predetermined distance from the optical system 320. The image module 310 includes an image source 311 and a frame unit 313. The image source 311 is disposed such that an exposed surface thereof faces the optical system 320. The frame unit 313 includes a frame 315 or 316 (shown in FIGS. 3A and 3B, respectively) and a mounting unit (not shown) for retaining the frame 315 or 316 to be mounted in the portions of the main body 200 to which the left eye unit 300a and the right eye unit 300b are connected.

Still referring to FIG. 2B, the image source 311 generates an image for forming a virtual image using image information input through the driving circuit 330. The image source 311 may comprise, for example, one of an LCD, an organic light emitting diode (OLED) display, and a liquid crystal on silicon (LCOS) display. Other types of image sources may also be used.

The LCD is an electrical device for converting various electrical information generated in several devices to visual information using the change of a transmittance of liquid crystal according to an applied voltage and outputting the visual information. For the reason that the LCD does not have self luminance, the LCD requires a back light unit (BLU), however the LCD has low power consumption and is formed as a flat panel display that is convenient and widely used as a portable device.

The OLED is a self-emitting organic material that emits light using an electroluminescence phenomenon in which light is emitted when a current flows to a phosphorous organic compound. The OLED, also called an organic diode or an organic electroluminescence (EL), can be advantageous to an LCD because the OLED typically has a better picture quality than the LCD, and the OLED is competitive in price due to a relatively simple manufacturing process. The OLED display can be driven at a low voltage and be formed with a small thickness. Further, the OLED display typically has a wide viewing angle and a fast response speed, so that, unlike a general LCD, picture quality does not change even when the OLED display is viewed from the side, and an afterimage does not remain on a screen.

The LCoS display is a projection type display device that uses a silicon wafer on which an electronic circuit is formed, instead of glass in an LCD element. The LCoS is a reflective technology in which liquid crystals are applied directly to the surface of a silicon chip coated with an aluminized layer that is highly reflective. The LCoS display uses a principle similar to that of the LCD, however the LCoS display and the LCD are different in that an LCD panel uses a technology of transmitting light through each pixel, whereas an LCoS display panel uses a technology of reflecting polarized light. A light source (red color, green color, and blue color) emitted from a lamp is reflected from a surface of an LCoS chip through a polarizing prism, and the reflected light source is formed with one image in a lens through a second polarizing prism.

Figure 3A:
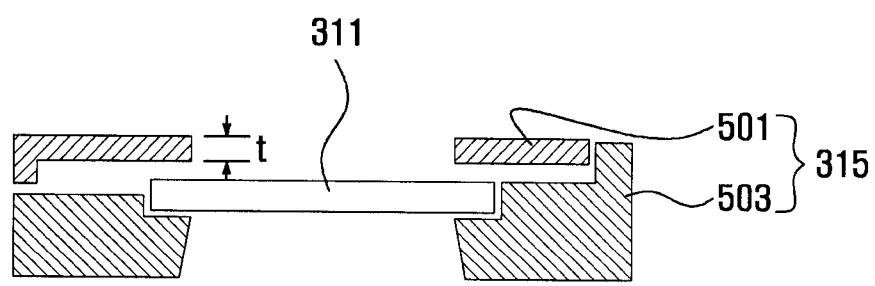
FIGS. 3A and 3B are cross-sectional views illustrating an image module of the HMD of FIG. 2A.
Figure 3B:
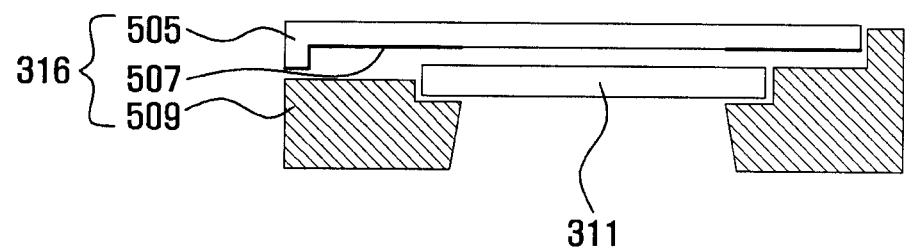

Referring again to FIGS. 3A and 3B, the image source 311 is inserted into a front portion of the frame 315 (shown in FIG. 3A) or 316 (shown in FIG. 3B). FIGS. 3A and 3B are cross-sectional views schematically illustrating the image source 311 and the frames 315 and 316, respectively, of the image module 310 of the HMD 100 of FIG. 2A. FIG. 3A illustrates an exemplary embodiment of the image module 310, and FIG. 3B illustrates another exemplary embodiment of the image module 310.

Referring now to FIG. 3A, in a part of the image module 310 according to an exemplary embodiment, a height (t) of a front portion of the frame 315 is typically about 0.15 mm or less for this example. The frame 315 includes a frame holder 503 for inserting the image source 311 and having an opening formed to expose the image source 311, and a frame cover 501 for retaining an outer surface of the image source 311. The frame cover 501 has a typical height (t) of about less than or equal to 0.15 mm for this example. In the frame holder 503, a rear portion of the frame 315 may be exposed according to the type of the image source 311. As described above, if a backlight is necessary, for example when the image source 311 is formed with an LCD, a rear portion of the frame 315 is exposed. However, if a backlight is unnecessary, for example when the image source 311 is formed with an OLED, an exposure portion does not exist in the frame 315. In FIG. 3A, only the image source 311 and the frame 315 are shown, however a mounting unit that can be connected to the main body 200 may be further included. The driving circuit 330 is connected to the image source 311.

Referring now to FIG. 3B, a part of the image module 310 according to another exemplary embodiment includes a frame cover 505, made of a transparent material, for covering an exposed surface of the image source 311. A portion 507 of the frame cover 505 adjacent to an outer edge of the exposed surface of the image source 311 has a black color. The frame 316 includes a frame holder 509 for inserting the image source 311, and the frame cover 505 made of a transparent material, such as glass or plastic, for covering the image source 311.

In a conventional HMD, an inclined portion having a thickness of about 0.5 to 1 mm exists between an exposed surface of the image source and a frame. Therefore, as a user with a conventional HMD recognizes the existence of a frame when viewing a virtual image, there is a problem that the user receives an impression that the virtual image exists at a distance nearer(closer) than a distance at which the virtual image is actually displayed, by analogizing a size of an enlarged image of the frame form. In order to solve the problem, a frame portion causing the problem can be modified by reducing the thickness of the frame portion as shown in FIG. 3A, or by covering the image source with a transparent material as shown in FIG. 3B.

The image module 310 can be connected to the portions of the main body 200 to which the left eye unit 300a and the right eye unit 300b are connected through a fixing screw 331 (shown in FIG. 2B). The image source 311 of the image module 310 is disposed towards the user's left and right eyes 400a and 400b. The fixing screw 331 connects the frame unit 313 of the image module 310 to the portions of the main body 200 to which the left eye unit 300a and the right eye unit 300b are connected. However, in order to connect the frame unit 313 to the main body 200, instead of utilizing the fixing screw 331, other joining forms, such as, for example adhesives, or a clip, are just two of the many examples that may be used that are within the spirit and scope of the invention.

Still referring to FIG. 2B, the optical system 320 is connected to portions of the main body 200 to which the left eye unit 300a and the right eye unit 300b are connected through a cover 333 disposed in a front surface of the optical system 320. The cover 333 has an opening for exposing a predetermined portion of the optical system 320, and the cover 333 is disposed in a front surface of the optical system 320 and connected to the main body 200 in order to prevent separation of the optical system 320 from the main body 200.

In the HMD 100 according to an exemplary embodiment of the present invention, a principle in which portions of the main body 200 to which the left eye unit 300a and the right eye unit 300b are connected are inclined by a predetermined angle to an axis of a central portion of the main body 200 is described hereinafter.

Figure 4A:
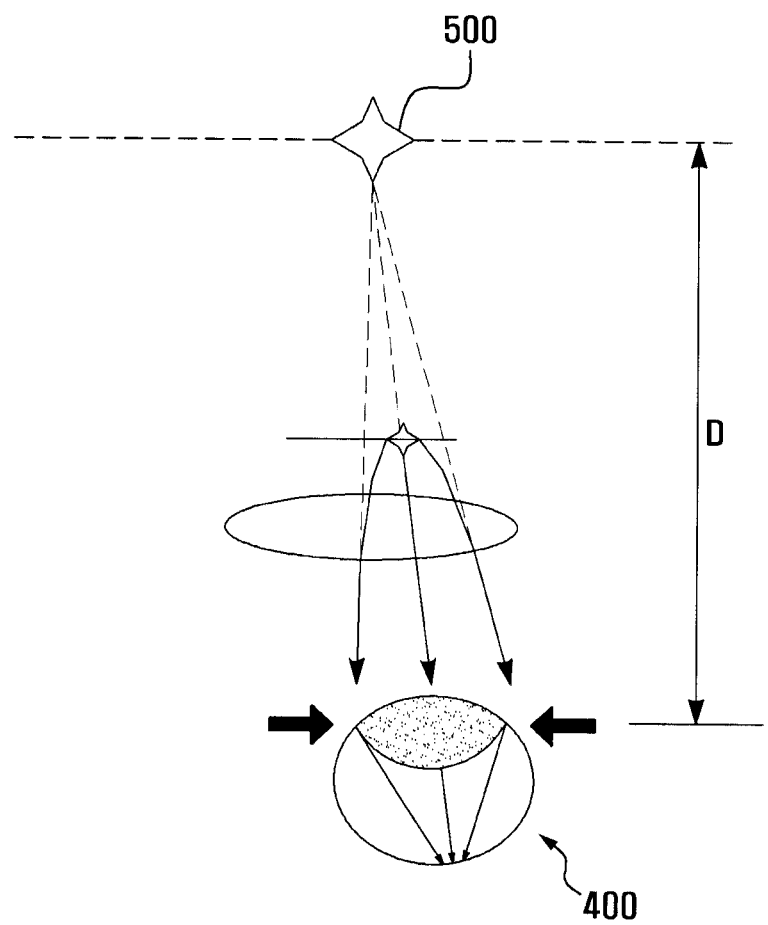
FIG. 4A is a diagram illustrating an exemplary method of using a monocular focus as a method by which a person determines a distance from an object.
Figure 4B:
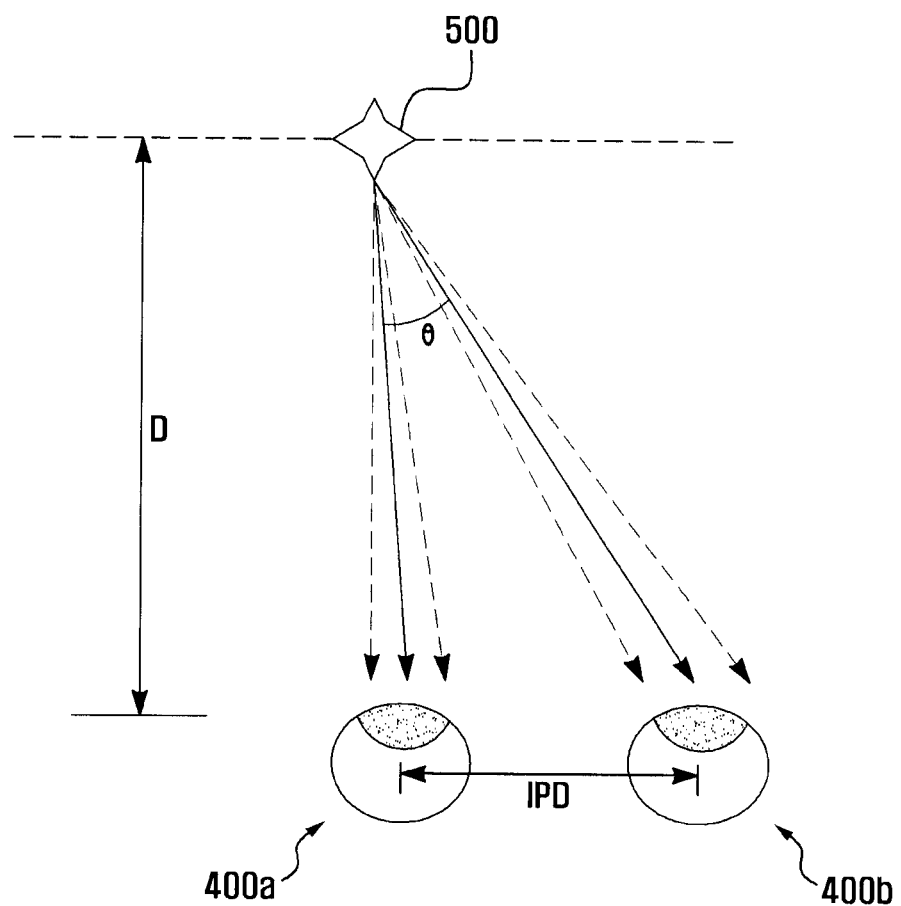
FIG. 4B is a diagram illustrating an exemplary method of using a both-eyes convergence as a method by which a person determines a distance from an object.

FIG. 4A is a diagram illustrating a method of using a monocular focus as a method by which a person determines a distance from an object, and FIG. 4B is a diagram illustrating a method of using two-eyes convergence as a method by which a person determines a distance from an object.

Methods by which a person determines a distance from a target object 500 include a method of using a monocular focus that uses a focus of one eye 400, as shown in FIG. 4A, and a method of using a two-eyes convergence that uses a convergence θ of both eyes 400a and 400b, as shown in FIG. 4B. Here, viewing of an actual object is exemplified, however the object corresponds to a virtual image according to an exemplary embodiment of the present invention.

Referring to FIG. 4A, the method of using a monocular focus uses a viewer's sense of vision to adjust an eyeball muscle in order to adjust a focus. In the method, a distance D to the target object 500 can be determined by the viewer using one eye 400 by relaxing an eyeball muscle when viewing a distant object and by contracting the eyeball muscle when viewing a near object. When the target object 500 exists within a distance of around 1m from the viewer, the method is effective. However, when viewing the target object 500 at a distance of more than 1m, the method of using a monocular focus is ineffective for determining the distance to the target object 500.

Referring to FIG. 4B, the method of using a two-eyes convergence determines a distance to the target object 500 using a convergence angle θ formed between a line of sight of both eyes 400a and 400b. Unlike the monocular focus method, the method of using a both-eyes convergence is effective in determining a distance of up to 20 m. Determination of a distance by a both-eyes convergence is represented by Equation 1.

$$\theta = \frac{IPD}{D} \qquad [\text{Equation 1}]$$

where an inter pupillary distance (IPD) is a distance between the centers of both eyes, as shown in FIG. 4B.

The IPD of a typical adult is about 60 to 65 mm. 'θ' is a convergence angle formed by a line of sight of both eyes, and 'D' is a distance between a person and a target object.

As described above, the method of using a monocular focus cannot effectively determine a distance of more than 1 m, whereas the method of using a two-eyes convergence can effectively determine a distance up to 20 m. Therefore, in order to solve a problem of the prior art that a user receives the impression that a virtual image is positioned at a short distance, an HMD to which a both-eyes convergence method of determining a distance is applied can be embodied.

Figure 5:
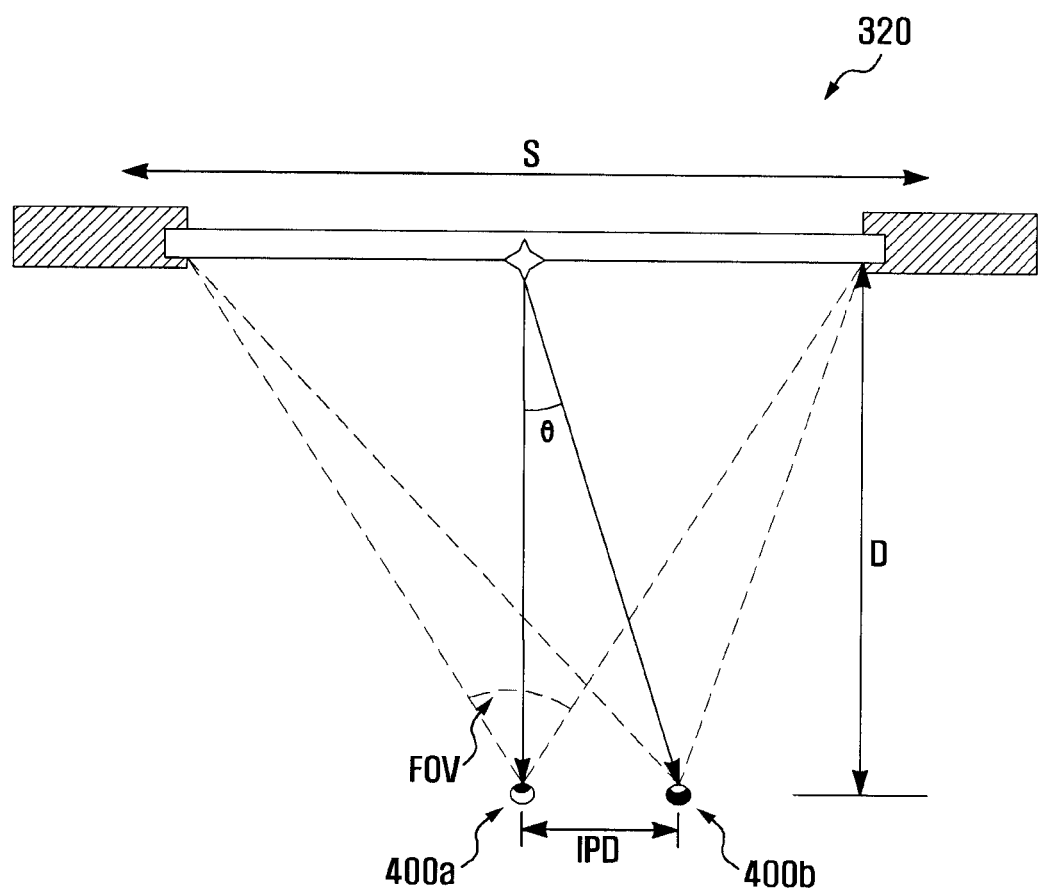
FIG. 5 is a view illustrating determination of a distance to a virtual image and a screen size of the virtual image using an HMD to which the method of both-eyes convergence of FIG. 4B is applied.

FIG. 5 is a view illustrating determination of a distance to a virtual image and a screen size of the virtual image using the HMD 100 to which the method of both-eyes convergence of FIG. 4B is applied.

As shown in FIG. 5, when the user views a virtual image through both eyes 400a and 400b, a size S of the virtual image based on a display distance D of the virtual image determined by the user is represented by Equation 2.

$$S = 2D\tan\left(\frac{FOV}{2}\right) \qquad [\text{Equation 2}]$$

where a field of view (FOV) indicates an angle formed by light emitted from both ends of the image source 311 after passing through the optical system 320.

For example, from Equation 2, if a virtual image determined by the user has an FOV of 24°, the user determines that a virtual image of size 84 cm exists at a distance of 2 m.

In the exemplary HMD 100 according to an exemplary embodiment of the present invention, recognition of a distance according to inclination of portions of the main body 200 to which the left eye unit 300a and the right eye unit 300b are connected is described hereinafter.

Figure 6:
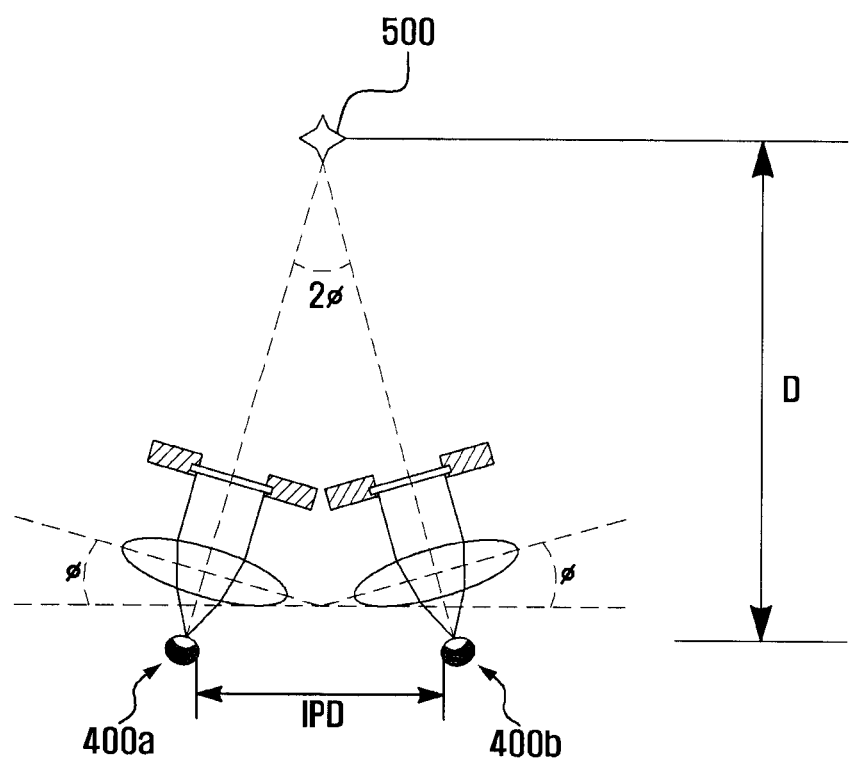
FIG. 6 is a view illustrating a tilt angle of portions of a main body to which a left eye unit and a right eye unit are connected for a target distance to a virtual image in the HMD of FIG. 2A.

FIG. 6 is a view illustrating a tilt angle of portions of the main body 200 to which the left eye unit 300a and right eye unit 300b are connected for a target distance to a virtual image in the HMD 100 of FIG. 2A.

Referring to FIG. 6, a tilt angle Φ at which portions of the main body 200 to which the left eye unit 300a and the right eye unit 300b are connected are inclined from the center of the main body 200 in the HMD 100 is represented by Equation 3.

$$\Phi = \frac{1}{2}\frac{IPD}{D}$$ [Equation 3]

where Φ is a tilt angle of portions of the main body 200 to which the left eye unit 300a and the right eye unit 300b are connected.

Equation 3 is derived from Equation 1, wherein the convergence angle θ of Equation 1 is equivalent to 2Φ of Equation 3.

Using Equation 3 to set a tilt angle of the portions of the main body 200 to which the left eye unit 300a and the right eye unit 300b are connected, when the target distance D is 3 m, the tilt angle Φ is 0.6°, when the target distance D is 2 m, the tilt angle Φ is 0.9°, and when the target distance D is 1.5 m, the tilt angle Φ is 1.2°. Here, it is assumed that the IPD is 63 mm, which is an average value of the IPD of a typical user. When the target distance D is less than 1.5 m, a user has the impression that a virtual image is too close, and when the target distance D is greater than 3 m, a user has the impression that a virtual image is too far away and thus the user cannot distinguish differences in distances to target objects. Accordingly, it is preferable to set a tilt angle of the portions of the main body 200 to which the left eye unit 300a and the right eye unit 300b are connected by setting a distance of 1.5 m to 3 m as the target distance D.

When the target distance D is 2 m, the size S of a virtual image is determined through Equation 2 as follows. When the FOV is 24°, the size S of a virtual image is determined by the user as 84 cm, and when the FOV is 35°, the size S of a virtual image is determined by the user as 127 cm.

According to the present invention, by utilizing a user's convergence so that a virtual image may be displayed at a target position, a variation of distance determination between users is reduced, and thus a viewing effect to the user of a virtual image being formed at a target position is obtained, thereby improving user satisfaction.

When an image module and an optical system, which are important constituent elements of the HMD, are formed in a conventional manner according to the prior art, and a main body is changed and processed by inclining a left eye unit and a right eye unit to sustain a predetermined angle from a connection unit and by reducing a height of a frame cover protruding from an exposed surface of the image source to a minimum, the HMD can be effectively with results heretofore unknown.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of present invention as defined in the appended claims. For example, while it is preferable the left eye unit and right eye unit are equally inclined, it is within the spirit and scope of the invention that the inclinations could be unequal.

What is claimed is:

1. A head-mounted display for forming a virtual image at a first predetermined distance in front of a pair of eyes, comprising:
    a left eye unit and a right eye unit,
    each eye unit having an image module for generating an image and an optical system disposed at a second predetermined distance from the image module and towards a respective one of the pair of eyes for forming the virtual image at the first predetermined distance from the respective one of the pair of eyes by enlarging an image generated by the image module; and
    a main body to which the left eye unit and the right eye unit are connected,
    wherein portions of the main body to which the left eye unit and the right eye unit are connected are each inclined to sustain a predetermined tilt angle from a center of the main body,
    wherein each image module further includes:
    an image source for generating an image for forming a virtual image visible to a respective eye, and having a transmission section for allowing external light from an external light source to pass through the image source to allow the external light to be visible to the respective eye;
    a frame holder having an opening for inserting the image source thereon, the opening formed to expose the image source in a direction of a respective one of the pair of eyes; and
    a frame cover positioned between the external light source and the image source for covering a part of an exposed surface of the image source or an entire exposed surface of the image source, thereby defining an aperture for the transmission section of the image source through which the external light passes;
    wherein the optical system generates the virtual image having a size S based on a predetermined field of view (FOV) angle and a selected display distance D of the virtual image from each respective eye.

2. The head-mounted display of claim 1, wherein the left eye unit and right eye unit are symmetrically inclined relative to the main body.

3. The head-mounted display of claim 1, wherein the left eye unit and right eye unit are attached to the main body at opposite sides.

4. The head-mounted display of claim 1, wherein the image source comprises a liquid crystal display (LCD), an organic light emitting diode (OLED) display or a liquid crystal on silicon (LCoS) display.

5. The head-mounted display of claim 1, wherein the frame cover has an opening which defines the aperture formed to expose the image source to the external light, retains an outer surface of the image source and has a height of about less than or equal to 0.15 mm.

6. The head-mounted display of claim 1, wherein the frame cover is made of a transparent material, covers an exposed surface of the image source and a portion of the frame cover adjacent to an outer edge of the exposed surface of the image source has a black color which defines the aperture for the external light to the image source.

7. The head-mounted display of claim 1, wherein the optical system is selected from the group consisting of a lens, a prism, a reflection mirror, and a combination thereof.

8. The head-mounted display of claim 1, wherein the optical system includes a lens system comprising a combination of an aspheric convex lens and an aspheric concave lens.

9. The head-mounted display of claim 1, wherein the image module comprises an image source comprising a display, and when the pair of eyes are oriented to view the virtual image through both the right eye unit and the left eye unit, the pair of eyes view the virtual image having the size S of the virtual image based on the display distance D of the virtual image determined by the user is represented by an equation as follows:

$$S = 2D\tan\left(\frac{FOV}{2}\right)$$

where the predetermined field of view (FOV) angle indicates an angle formed by light emitted from both ends of the image source after passing through the optical system.

10. The head-mounted display of claim 1, wherein, when the image source is a liquid crystal display (LCD), a rear portion of a frame comprised of the frame holder and the frame cover is exposed.

11. The head-mounted display of claim 1, wherein, when the image source is an organic light-emitting diode (OLED), a rear portion of a frame comprised of the frame holder and the frame is enclosed.

12. A head-mounted display for forming a virtual image at a first predetermined distance in front of a pair of eyes, comprising:
a pair of eye units, each positioned to be viewable by a respective eye associated with the eye unit, with each eye unit having:
an image module for generating an initial image; and
an optical system disposed at a second predetermined distance from the image module and towards a respective one of the pair of eyes for forming the virtual image at the first predetermined distance from the associated eye by enlarging the initial image; and
a main body having portions to which the eye units are connected,
wherein the portions of the main body are each inclined to sustain a predetermined tilt angle from a center of the main body,
wherein each image module further includes:
an image source for generating the initial image for forming the virtual image by emitting image light visible to a respective eye, and having a transmission section for allowing external light from an external light source to pass through the image source to allow the external light to be visible to the respective eye, wherein the image source has a display with a light generating surface having a pair of ends which generates the initial image by emitting the image light from the light generating surface between the pair of ends, wherein the emitted image light is radiated at a predetermined field of view (FOV) angle after passing through the optical system; and
a frame cover positioned between the external light source and the image source for covering a part of an exposed surface of the image source or an entire exposed surface of the image source, thereby defining an aperture for the transmission section of the image source through which the external light passes;
wherein the optical system generates the virtual image having a size S determined by the predetermined FOV angle and a selected display distance D of the virtual image from each respective eye, with the size S determined by an equation as follows:

$$S = 2D\tan\left(\frac{FOV}{2}\right).$$

13. The head-mounted display of claim 12, wherein the eye units are symmetrically inclined relative to the main body.

14. The head-mounted display of claim 12, wherein the eye units are attached to the main body at opposite sides.

15. The head-mounted display of claim 12, wherein each image source comprises a liquid crystal display (LCD), an organic light emitting diode (OLED) display or a liquid crystal on silicon (LCOS) display.

16. The head-mounted display of claim 12, wherein each optical system is selected from the group consisting of a lens, a prism, a reflection mirror, and a combination thereof.

17. The head-mounted display of claim 12, wherein each optical system includes a lens system comprising a combination of an aspheric convex lens and an aspheric concave lens.

* * * * *